Dec. 18, 1962

A. RAMELLA 3,069,350

REFORMING NAPHTHAS CONTAINING DELETERIOUS
AMOUNTS OF NITROGEN OR ARSENIC

Filed July 14, 1959

INVENTOR.
AMILCARE RAMELLA
BY
Francis F. Johnston
AGENT

United States Patent Office

3,069,350
Patented Dec. 18, 1962

3,069,350
REFORMING NAPHTHAS CONTAINING DELETERIOUS AMOUNTS OF NITROGEN OR ARSENIC
Amilcare Ramella, Woodbury, N.J., assignor to Socony Mobil Oil Company, Inc., a corporation of New York
Filed July 14, 1959, Ser. No. 826,989
13 Claims. (Cl. 208—89)

The present invention relates to the reforming of naphthas containing deleterious amounts of nitrogen or arsenic in the presence of particle-form reforming catalysts sensitive to nitrogen and arsenic and, more particularly, to the reforming of naphthas containing in excess of 1 part per million (p.p.m.) of nitrogen and 0.002, or more than 0.002 part per million of arsenic in conjunction with naphthas containing not more than 1 p.p.m. of nitrogen and containing greater than 0.002 part per million arsenic, in the presence of particle-form reforming catalysts sensitive to nitrogen and arsenic.

As used herein "deleterious amounts of nitrogen and arsenic" are concentrations of nitrogen or arsenic in the hydrocarbon feed to a reforming reaction zone employing a particle-form reforming catalyst which deactivate the catalyst reversibly or irreversibly to an extent in excess of the reversible deactivation due to the carbon deposited on the catalyst during an onstream period. Nitrogen is a catalyst poison which produces reversible poisoning of the catalyst. That is to say, after a nitrogen-sensitive catalyst has been deactivated or poisoned by contact with nitrogen the activity of the poisoned catalyst can be restored by reducing the nitrogen content of the feed below the level at which the catalyst is poisoned. On the other hand, arsenic causes irreversible poisoning or deactivation of the catalyst. That is to say, the catalyst absorbs arsenic and in an interval dependent upon the particular catalyst the absorbed arsenic reaches a concentration on the catalyst at which both selectivity and activity of the catalyst has declined to a substantial extent. Arsenic is not removed during regeneration nor by contact with a feed containing little or no arsenic. Consequently, it is necessary to reduce the arsenic content in the feed to a value at which in the useful life of the catalyst, i.e., one onstream period for a non-regenerable catalyst and a plurality of cycles comprising alternate on-stream and regeneration periods for a regenerable catalyst, the amount of arsenic absorbed by the catalyst will not exceed the concentration at which the selectivity and activity of the catalyst is reduced to a substantial extent. Specifically, for a platinum-type reforming catalyst comprising 0.1 to about 2.0 percent by weight of one or more of the metals of the platinum group such as platinum and palladium, and a carrier such as a refractory oxide, e.g., alumina, a deleterious amount of nitrogen is more than 1 p.p.m. of nitrogen in the hydrocarbon feed to the reforming unit. A deleterious amount of arsenic when reforming in the presence of the aforesaid platinum-group catalyst is an amount of arsenic in excess of 0.002 part per million in the hydrocarbon feed to the reforming unit.

Preferably, the hydrocarbon feed to a reforming unit employing a platinum-group metal reforming catalyst is essentially free of arsenic. As used herein, "essentially free of arsenic" designates a concentration of arsenic in a reformer feed which, when said reformer feed is contacted with a bed of reforming catalyst comprising 0.35 percent by weight of platinum on alumina support, is insufficient to deactivate said catalyst within the life of the catalyst, for example two years, as determined by other factors such as the temperature required to produce a reformate having an octane rating of at least 100 (R+3 cc.), the yield of reformate, and the mechanical strength of the catalyst.

Reforming is the designation given to a hydrocarbon conversion in which one or more of the reactions, dehydrogenation, isomerization, dehydrocyclization and hydrocracking take place.

It is known that nitrogen like sulfur can be removed from mixtures of hydrocarbons containing nitrogen and/or sulfur by contact with a catalyst such as a mixture of oxides of cobalt and molybdenum or a catalyst comprising platinum or palladium on a carrier in the presence of hydrogen at elevated temperatures and pressures.

It is also known that arsenic can be removed from mixtures of hydrocarbons such as naphtha by contact with a finely divided adsorbent such as Attapulgus clay, activated alumina and the like at temperatures of the order of 50° to 180° F. or at temperatures above the condensation temperature of the hydrocarbon mixture.

It is also known that, while straight run naphthas usually contain less than about 1 p.p.m. and generally about 0.2 to about 0.5 p.p.m. of nitrogen, thermal, TCC, or coker naphthas usually contain 40 to 400 p.p.m. of nitrogen. Under mild conditions, naphtha containing about 10 p.p.m. of nitrogen can be hydrodecontaminated in the presence of a mixture of oxides of cobalt and molybdenum to provide a hydrodecontaminated product or reformer feed containing not more than about 1 p.p.m. Under more severe conditions, for example, at about 800 p.s.i.g., about 850° F. and when circulating about 2500 s.c.f. of hydrogen per barrel of hydrocarbon treated, the nitrogen content of a hydrocarbon mixture containing 200 p.p.m. of nitrogen can be reduced to not more than 1 p.p.m.

Hydrogenating catalysts having desulfurizing and denitrogenizing capabilities such as a mixture of oxides of cobalt and molybdenum on a support comprising alumina also have the capability of fixing arsenic. The catalyst absorbs or becomes saturated with arsenic at a rate dependent upon the concentration of arsenic in the feed. The higher the concentration of arsenic in the feed the higher the arsenic saturation point of the catalyst. That is to say, the catalyst can absorb a limiting amount of arsenic. Hence, the greater the average concentration of arsenic in the hydrocarbon feed the shorter the time required to reach the limiting concentration of arsenic in the catalyst. Thus, when a hydrocarbon mixture containing 10 p.p.m. of arsenic is contacted with a hydrogenating catalyst comprising about 3 percent by weight oxide of cobalt and about 16 percent by weight oxide of molybdenum on alumina as a carrier the catalyst will absorb about two pounds of arsenic per ton. Thereafter, the arsenic is not absorbed by the catalyst and arsenic is present in the effluent from the treating unit, i.e., the reformer feed, in concentrations, sufficient to seriously shorten the life of the platinum-group metal reforming catalyst. Accordingly, to ensure protection of the costly reforming catalyst the cobalt-molybdenum catalyst must be discarded when the catalyst has been contacted with a total amount of hydrocarbon mixture to deposit on the catalyst about 1.5 pounds of arsenic per ton (2000 lbs.) of catalyst.

On the other hand, when the hydrocarbon mixture to be hydrodesulfurized and/or hydrodenitrogenized is essentially free from arsenic the catalyst used for hydrodesulfurizing and/or hydrodenitrogenizing can be regenerated and not discarded.

Furthermore, some mixtures of hydrocarbons to be reformed are sufficiently low in sulfur and/or nitrogen not to require hydrodesulfurization and hydrodenitrogenation but contain sufficient, i.e., more than 0.002 p.p.m., arsenic to seriously reduce the life of a platinum-group metal, reforming catalyst.

Illustrative of hydrocarbon mixtures not requiring hydrodesulfurization and/or hydrodenitrogenation is a straight run naphtha having a boiling range of about 180° F. to about 350° F. containing less than 1 p.p.m. of nitrogen and about 0.020 p.p.m. of arsenic.

While a hydrogenating catalyst such as one comprising oxides of cobalt and molybdenum on a carrier such as alumina is a relatively cheap material compared with a platinum-group metal reforming catalyst, nevertheless in the endless task of reducing the cost of petroleum products means has been sought to reduce the cost of pretreating by removing arsenic before the hydrocarbon mixture to be hydrodesulfurized and/or hydrodenitrogenized is contacted with the hydrogenating catalyst.

Several prior art disclosures recommend oxidizing the arsenic or otherwise converting the arsenic to a more readily removable form. Among these disclosures are those contained in U.S. Patents Nos. 2,769,770; 2,778,779; 2,779,715; 2,781,297; and 2,782,143. German patent application No. 1,042,804 (published November 6, 1958) recommends the addition of 0.1 to 15 percent by weight of boron oxide to the cobalt-molybdenum type desulfurization catalyst to improve desulfurization and to improve the removal of nitrogen and arsenic compounds. The removal of arsenic compounds by contact with partially deactivated platinum reforming catalyst at temperatures of the order of 255° F. to about 795° F. is disclosed in Italian Patent No. 525,388 (published May 4, 1955).

It is now proposed to contact an arsenic-containing hydrocarbon mixture with a cheap adsorbent for arsenic prior to hydrodecontamination in the presence of the more costly hydrodecontamination catalyst or to contact an arsenic-containing hydrocarbon mixture with a hydrogenating catalyst at a temperature below about 440° F. but at a temperature at which in the presence of hydrogen arsenic is converted to arsine, in this way avoiding saturation of relatively costly hydrogenating catalyst. The arsine-containing effluent is then contacted with a cheap adsorbent at a temperature of at least 440° F. to decompose the arsine with deposition of the arsenic on the cheap adsorbent. Thereafter, the hydrocarbon mixture is hydrodecontaminated, i.e., hydrodesulfurized and/or hydrodenitrogenized. In all instances the pretreated hydrocarbon mixture to be reformed, i.e., the reformer feed must contain not more than 1 p.p.m. of nitrogen and be essentially free from arsenic, i.e., contain not more than 0.002 p.p.m. (2 p.p. billion) of arsenic and preferably less.

CASE I

Thus, a first hydrocarbon mixture containing in excess of 10 p.p.m. of nitrogen but not sufficient arsenic to seriously shorten the life of the hydrodecontaminating catalyst, i.e., containing not more than 0.100 p.p.m. of arsenic, can be hydrodecontaminated in the presence of hydrogen and a hydrogenating catalyst having hydrodesulfurizing and/or hydrodenitrogenizing capabilities, e.g., a mixture of oxides of cobalt and molybdenum on a refractory oxide support such as alumina to produce a pretreated first hydrocarbon mixture containing not more than 20 p.p.m. of nitrogen which is essentially free from arsenic. The pretreated first hydrocarbon mixture is mixed with a second hydrocarbon mixture containing less nitrogen than the aforesaid pretreated first hydrocarbon mixture to provide a blend containing not more than 1 p.p.m. of nitrogen which is essentially free from arsenic.

The aforesaid second hydrocarbon mixture can be untreated naphtha containing not more than 0.5 p.p.m. of nitrogen and essentially free from arsenic, which when mixed in the proportion of 95 volumes with 5 volumes of the aforesaid pretreated first hydrocarbon mixture containing not more than 10 p.p.m. of nitrogen provides a blend reformer feed containing not more than 1 p.p m. of nitrogen which is essentially free from arsenic. Alternatively, the second hydrocarbon mixture can be sufficiently low in nitrogen that when mixed with the aforesaid pretreated first hydrocarbon mixture a blend reformer feed is obtained containing not more than 1 p.p.m. of nitrogen which is not essentially free from arsenic. In this situation the second hydrocarbon mixture containing not more than 0.100 p.p.m. of arsenic is contacted with a solid adsorbent such at Attapulgus clay preferably at temperatures of about 50° to about 180° F. to reduce the arsenic content of the said second hydrocarbon mixture to a level such that when mixed with the aforesaid pretreated first hydrocarbon mixture to form a blend reformer feed, the blend reformer feed is essentially free from arsenic, i.e., contains not more than 0.002 p.p.m. of arsenic and not more than 1 p.p.m. of nitrogen.

CASE II

Many mixtures of hydrocarbons such as thermal naphthas to be reformed not only contain excessive, i.e., more than 20 p.p.m. of nitrogen but in addition contain amounts of arsenic in excess of that which does not seriously shorten the life of the catalyst employed for reducing the nitrogen content of the hydrocarbon mixture to not more than 20 p.p.m. Amounts of arsenic in excess of that which can be tolerated are greater than 0.05 to, but not more than, 0.100 p.p.m. of arsenic. In that event the high nitrogen first hydrocarbon mixture likewise is contacted with a solid adsorbent such as Attapulgus clay prior to hydrogenation.

Alternatively, the high nitrogen first hydrocarbon mixture is contacted with a hydrogenating catalyst in the presence of hydrogen at a temperature below the decomposition temperature of arsine, for example at a temperature within the limits of about 200° to about 400° F. at pressures 100 to 1000 p.s.i.g., preferably at pressures somewhat higher than that at which the first hydrocarbon mixture is hydrodenitrogenized and/or hydrodesulfurized, at space velocities within the range of about 1 to 10 and at a hydrogen circulation of about 350 to about 1000 standard cubic feet per barrel of first hydrocarbon mixture. The effluent of the first hydrogenation is then contacted at a temperature at which arsine decomposes to arsenic and hydrogen in contact with a solid adsorbent such as Attapulgus clay. Suitable temperatures for the decomposition of arsine are those in excess of about 440° F. In the adsorber the arsenic is deposited on the adsorbent, e.g., clay. The effluent of the adsorber is heated to hydrodesulfurizing and/or hydrodenitrogenizing temperatures and contacted with a hydrogenating catalyst having hydrodesulfurizing and/or hydrodenitrogenizing capabilities.

Accordingly, the present invention has as an object treating a first hydrocarbon mixture to reduce the nitrogen content and the arsenic content thereof to levels such that when mixed with a second-treated hydrocarbon mixture the blend is essentially free from arsenic and contains not more than 1 p.p.m. of nitrogen. It is another object of the present invention to treat a first hydrocarbon mixture containing more than 10 p.p.m. of nitrogen and containing arsenic in excess of 0.002 p.p.m. to reduce the nitrogen content thereof to not more than 20 p.p.m. and the arsenic content to a level such that when mixed with a treated second hydrocarbon mixture to form a blend the blend is essentially free from arsenic and contains not more than 1 p.p.m. of nitrogen. It is a further object of the present invention to first subject a first hydrocarbon mixture containing more than 0.002 p.p.m. of arsenic to hydrogenation to produce arsine, to decompose the arsine and absorb the arsenic produced and in a second treatment hydrodenitrogenize the first hydrocarbon mixture to produce a pretreated first hydrocarbon mixture containing not more than 1 p.p.m. of nitrogen, to contact a second hydrocarbon mixture containing not more than 1 p.p.m. of nitrogen and more than 0.002 p.p.m. of arsenic with a solid adsorbent to produce a treated second hydrocarbon mixture which, when mixed with the aforesaid pretreated first hydrocarbon mixture in the ratio of 5 to 95, preferably 50 to 90 parts of the aforesaid treated second hydrocarbon mixture with 95 to 5, preferably 50 to 10 parts, of the aforesaid pretreated first hydrocarbon the blend so produced is essentially free from arsenic, i.e., contains not more than 0.002 p.p.m. of arsenic and contains not more than 1 p.p.m. of nitrogen. The present invention contemplates reforming the blends produced as described hereinbefore in the presence of hydrogen-containing gas and nitrogen- and arsenic-sensitive particle-form reforming catalyst.

The flowsheet of FIGURE 1a is illustrative of the treatment of a first hydrocarbon mixture containing in excess of 20 p.p.m. of nitrogen and essentially free of arsenic or containing insufficient arsenic to require reduction thereof to provide a blending component which is essentially free of arsenic. FIGURE 1 also illustrates the treatment of a second hydrocarbon mixture containing less than 1 p.p.m. of nitrogen but a concentration of arsenic in excess of 0.002 but not in excess of 0.100 p.p.m.

The flowsheet of FIGURE 1b is illustrative of the treatment of a first hydrocarbon mixture containing in excess of 0.002 p.p.m. of arsenic and in excess of 20 p.p.m. of nitrogen wherein the arsenic is hydrogenated at a temperature below 440° F. to produce arsine, the arsine is decomposed at a temperature of at least 440° F. and the arsenic so produced deposited on a solid adsorbent and the effluent of the absorber contacted at a temperature of at least 600° F. with a hydrogenating catalyst in the presence of hydrogen-containing gas to hydrodenitrogenize the arsenic free, i.e., containing less than 0.002 p.p.m. of arsenic, first hydrocarbon mixture to reduce the nitrogen content to not more than 20 p.p.m. and produce a suitable blending component for a reformer blend feed.

The high-nitrogen naphtha can be hydrodecontaminated in the presence of a hydrogenating catalyst having hydrodenitrogenizing capabilities under conditions set forth in Table I to produce a hydrodecontaminated naphtha having a nitrogen level which when blended with the percolated naphtha will provide a blend containing not more than 1 p.p.m. of nitrogen.

*Table I*

| | |
|---|---|
| Catalyst | About 1.5 to 3.8 wt. percent cobalt oxide; about 7 to 16 wt. percent molybdenum oxide carrier-alumina. |
| Pressure, p.s.i.g. | 100 to 1000. |
| Hydrogen, s.c.f./b. | 350 to 2500. |
| Space velocity, v./hr./v. | 1 to 10. |
| Temperature, ° F. | 600 to 850. |

A high arsenic naphtha can be contacted with an adsorbent under the conditions set forth in Table II to produce a percolated naphtha which, if not further treated, has an arsenic content which when blended with the hydrodecontaminated naphtha will give a blend containing not more than 0.002 p.p.m. of arsenic.

*Table II*

| | |
|---|---|
| Adsorbent | Low volatile, hydrated aluminum-magnesium silicate, e.g., acid treated and calcined Attapulgus clay. Preferably 30–60 mesh, i.e., pass 30 mesh screen, retained on 60-mesh screen. |
| Treating temp., ° F. | 50–180. |
| Bbls./ton | 10,000 to 40,000. |

Illustrative of the present invention is the hydrodecontamination of a thermal naphtha containing about 0.025 p.p.m. of arsenic and about 24 p.p.m. of nitrogen under conditions to produce a hydrodecontaminated naphtha containing <0.002 p.p.m. of arsenic and not >15 p.p.m. of nitrogen under the conditions set forth in Table III.

*Table III*

| | |
|---|---|
| Pressure, p.s.i.g. | 450 |
| Temperature, ° F. | 675 |
| Space velocity, v./hr./v. | 2.3 |
| Hydrogen/b., s.c.f. | 2000 |

A low-nitrogen, high-arsenic, straight-run naphtha containing 0.5 p.p.m. of nitrogen and 0.0200 p.p.m. of arsenic was contacted with Attapulgus clay under the conditions set forth in Table II to produce a percolated naphtha containing 0.5 p.p.m. of nitrogen and 0.002 p.p.m. of arsenic.

The aforesaid percolated naphtha was mixed with the aforesaid hydrodecontaminated naphtha in the ratio of 20 volumes of the former and 80 volumes of the latter to provide a reformer feed blend naphtha containing 1 p.p.m. of nitrogen and about 0.002 p.p.m. of arsenic.

Figure 1A:
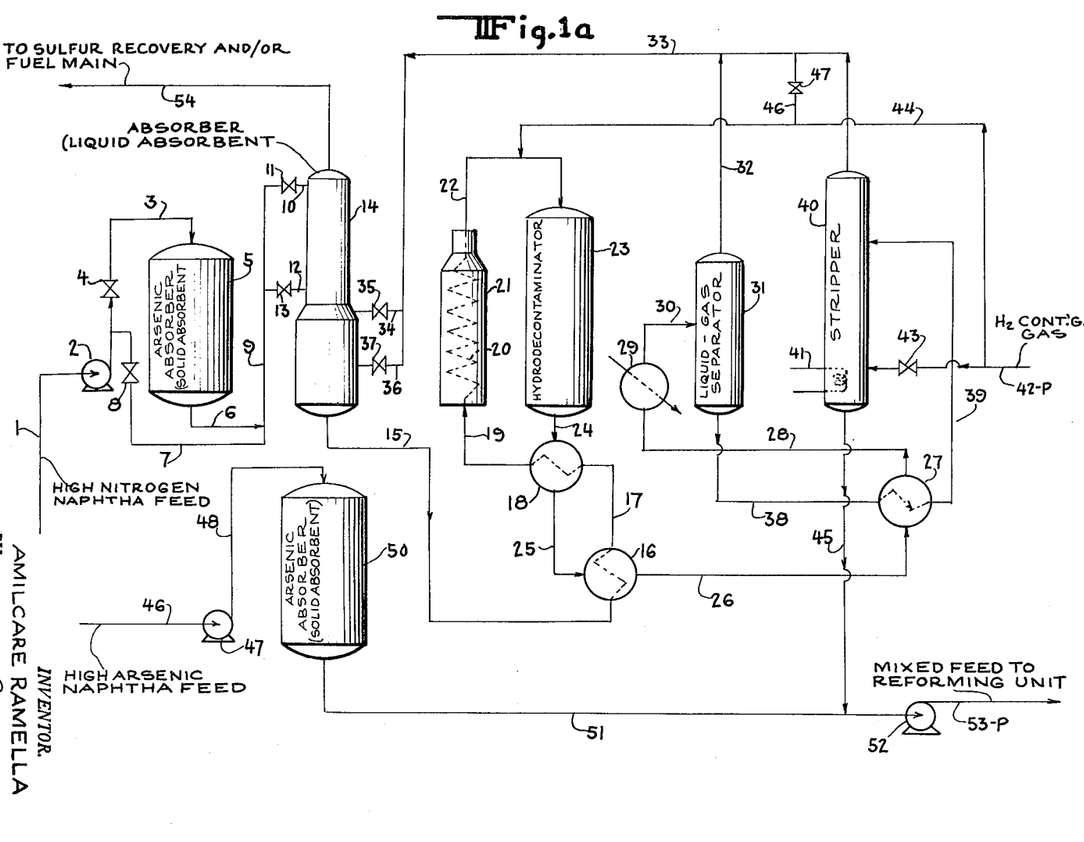
Figure 1B:
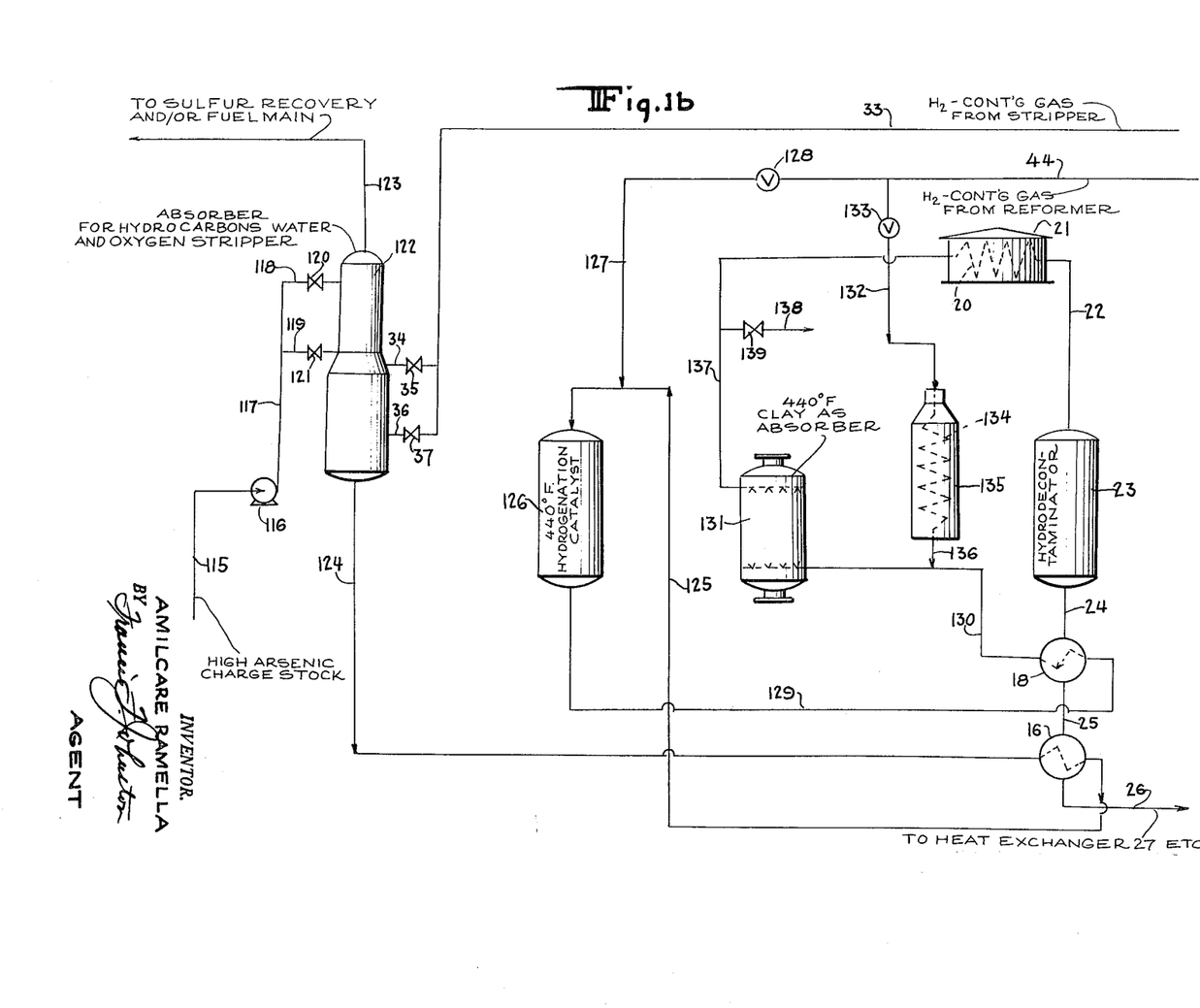
Figure 2:
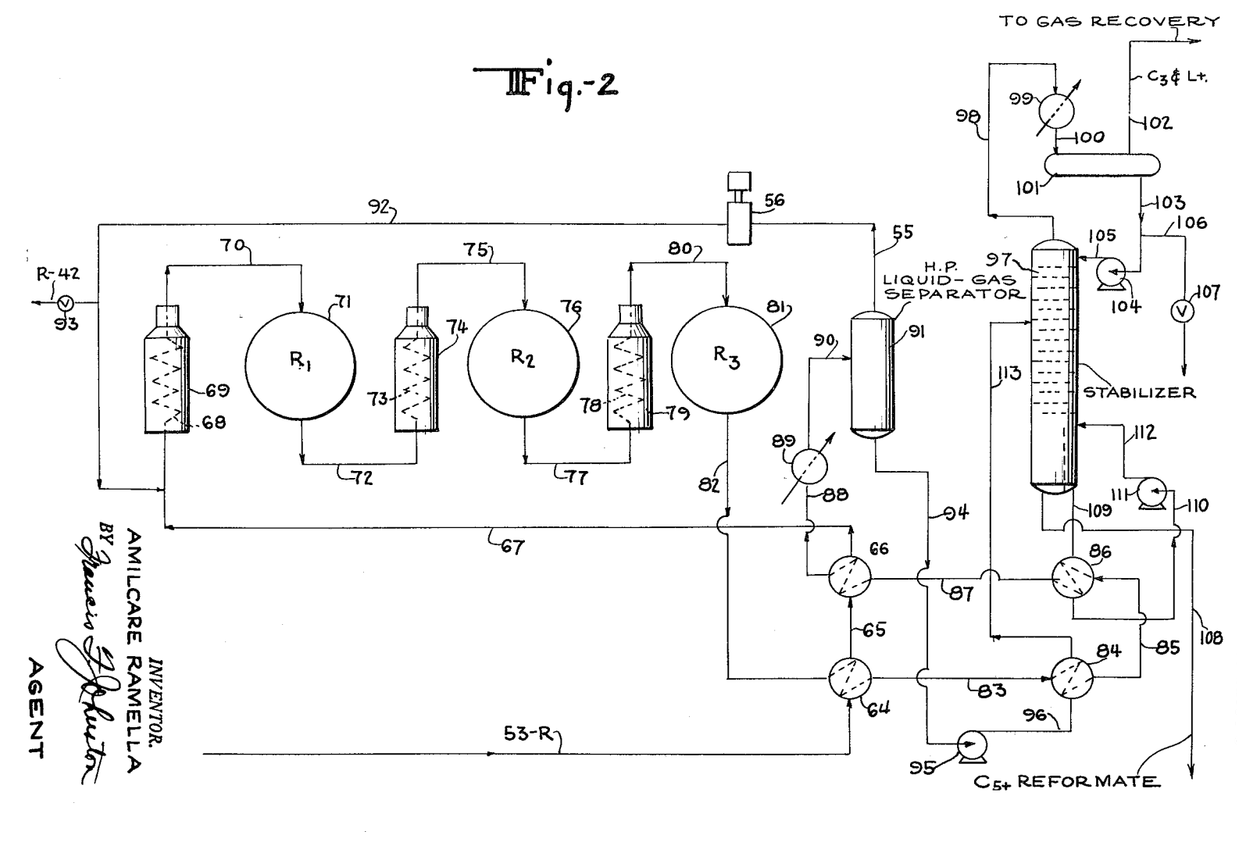
FIGURE 2 is a flowsheet illustrative of the reforming of a reformer blend feed produced in accordance with the principles illustrated in FIGURES 1a and 1b employing an arsenic- and nitrogen-sensitive catalyst such as a platinum-group metal reforming catalyst, e.g., a platinum reforming catalyst comprising about 0.2 to about 2.0 percent by weight of platinum and about 0.1 to about 0.8 percent by weight of a halogen such as fluorine and chlorine on a support such as alumina.

Illustrative of the method of the present invention is the flowsheet of the drawings 1a, 1b, and 2.

A first hydrocarbon mixture containing in excess of 20 p.p.m. of nitrogen is drawn from a source not shown through pipe 1 by pump 2. (See FIGURE 1a.) Pump 2 discharges the first hydrocarbon mixture into pipe 3. When the first hydrocarbon mixture contains more than 0.100 p.p.m. of arsenic the first hydrocarbon mixture flows through pipe 3 (valve 4 open; valve 8 closed) to absorber 5. The first hydrocarbon mixture flows downwardly through absorber 5 in contact with solid adsorbent such as Attapulgus clay to pipe 6 and thence to pipe 9. When the first hydrocarbon mixture contains appreciably less than 0.100 p.p.m. of arsenic the absorber 5 is by-passed. That is to say, with valve 4 closed and valve 8 open the first hydrocarbon mixture flows through pipe 7 to pipe 9. When the arsenic content of the first hydrocarbon mixture is too high to permit the total flow of first hydrocarbon mixture to by-pass absorber 5, but not in excess of 0.1 p.p.m. of arsenic, the flow through pipe 3 and the flow through pipe 7 is regulated so that the blend of the absorber effluent and the portion of the first hydrocarbon mixture flowing through pipe 7 contains not more than 0.050 p.p.m. of arsenic.

The first hydrocarbon mixture containing not more than 0.050 p.p.m. of arsenic flows through branches 10 and 12 of pipe 9 to liquid absorber 14. In liquid absorber 14 the first hydrocarbon mixture is contacted with gas containing $C_4$ and heavier hydrocarbons flowing from liquid-gas separator 31 or from separator 31 and stripper 40 through conduit 33 and branches thereof 34 and 36. The volumes of first hydrocarbon mixture flowing through branches 10 and 12 are controlled by valves 11 and 13 respectively. The volumes of gas flowing through branches 34 and 36 are controlled by valves 35 and 37. The volumes of first hydrocarbon mixture flowing through branches 10 and 12 and the volumes of gas flowing through branches 34 and 36 are regulated to strip substantially all of the oxygen, water, and heat exchanger deposit precursors from the first hydrocarbon mixture and to strip substantially all of the C$_4$ and heavier hydrocarbons from the gas. A temperature within the limits of about 100° to about 150° F. usually is maintained in liquid absorber 14.

The stripped gas flows from liquid absorber 14 through conduit 54 to means for the recovery of sulfur and ammonia and ultimately to the refinery fuel main, directly to the refinery fuel main or to other processes capable of using gas containing hydrogen of this concentration.

The stripped first hydrocarbon mixture flows through pipe 15 to heat exchanger 16 where the stripped first hydrocarbon mixture is in indirect heat exchange relation with the effluent of hydrodecontaminator 23 flowing from heat exchanger 18 through conduit 25. From heat exchanger 16 the first hydrocarbon mixture flows through pipe 17 to heat exchanger 18 where the first hydrocarbon mixture is in indirect heat exchange relation with the hydrodecontaminator effluent flowing therefrom through conduit 24.

From heat exchanger 18 the first hydrocarbon mixture flows through pipe 19 to coil 20 in heater 21. In heater 21 the first hydrocarbon mixture is heated to a hydrodenitrogenizing temperature within the limits set forth hereinbefore. From heater 21 the first hydrocarbon mixture flows through conduit 22 to hydrodecontaminator 23. At a point in conduit 22 intermediate to heater 21 and hydrodecontaminator 23 hydrogen-containing gas, for example recycle gas flowing from a reformer through conduits P–42 and 44 or a mixture of recycle gas and stripper overhead flowing from stripper 40 through conduits 33 and 46 to conduit 44 is mixed with the first hydrocarbon mixture to maintain the hydrogen circulation set forth hereinbefore.

In hydrodecontaminator 23 the first hydrocarbon mixture and hydrogen-containing gas flow downwardly in contact with a hydrogenating catalyst having hydrodenitrogenizing capabilities. The effluent of hydrodecontaminator 23 flows through conduit 24 to heat exchanger 18 and thence through conduit 25 to heat exchanger 16 as previously described. From heat exchanger 16 the hydrodecontaminator effluent flows through conduit 26 to heat exchanger 27 where the hydrodecontaminator effluent is in indirect heat exchange relation with the effluent condensate flowing from gas-liquid separator 31 through pipe 38. From heat exchanger 27 the hydrodecontaminator effluent flows through conduit 28 to cooler 29 where the effluent is cooled to a temperature at which C$_4$ and heavier hydrocarbons are condensed at the pressure existing in separator 31.

From cooler 29 the hydrodecontaminator effluent flows through conduit 30 to liquid-gas separator 31. In separator 31 a vent gas comprising the hydrogen, hydrocarbons having less than four carbon atoms, hydrogen sulfide, and ammonia of the hydrodecontaminator effluent separate from the C$_4$ and heavier hydrocarbons of the effluent. The effluent vent gas flows from separator 31 through conduits 32 and 33, and branches 34 and 36 to liquid absorber 14 and thence through conduit 54 as described hereinbefore.

The effluent condensate comprising C$_4$ and heavier hydrocarbons, and trace concentrations of hydrogen sulfide and ammonia flows from separator 31 through pipe 38 to heat exchanger 27 and thence through pipe 39 to stripper 40.

In stripper 40 the effluent condensate is contacted with a stripping gas, e.g., recycle gas from a reformer at a temperature, maintained for example by steam coil 41, at which trace concentrations of hydrogen sulfide and ammonia are removed. A suitable temperature at which C$_4$ and lighter hydrocarbons are volatile is maintained in stripper 40. Recycle gas flowing from the reformer (FIGURE 2, conduit R–42) through conduit P–42 under control of valve 43 is introduced into stripper 40. The stripping gas flows upwardly to conduit 33 and thence to liquid absorber 14. A part or all of the stripping gas can be diverted through conduit 46 under control of valve 47 to conduit 44 and flow thence to hydrodecontaminator 23. From stripper 40 the stripped condensate flows through pipe 45 to pipe 51 where the condensate is mixed with treated second hydrocarbon mixture in proportions to produce a blend reformer feed containing not more than 1 p.p.m. of nitrogen and essentially free from arsenic, i.e., containing not more than 0.002 p.p.m. of arsenic.

A second hydrocarbon mixture containing substantially less than 1 p.p.m., say about 0.5 p.p.m., of nitrogen but containing more than 0.002 p.p.m. of arsenic is drawn from a source not shown through pipe 46 by pump 47. Pump 47 discharges the second hydrocarbon mixture into pipe 48. The second hydrocarbon mixture flows through pipe 48 to solid absorber 50. In solid absorber 50 the second hydrocarbon mixture is in contact with a solid adsorbent such as Attapulgus clay which absorbs the arsenic-containing compounds. The effluent from solid absorber 50 flows through pipe 51. In pipe 51 the effluent of absorber 50 is mixed with the stripper bottoms to provide a blend reformer feed containing not more than 1 p.p.m. of nitrogen and essentially free from arsenic.

When the first hydrocarbon mixture not only contains more than 20 p.p.m. of nitrogen but in addition the arsenic concentration is in excess of 0.002 as described hereinbefore, the arsenic can be removed in an alternative manner as illustrated in FIGURE 1b. Thus, a high nitrogen, i.e., more than 20 p.p.m. of nitrogen, naphtha is drawn from a source not shown through pipe 115 by pump 116. Pump 116 discharges the first hydrocarbon mixture into pipe 117 through which it flows to branches 118 and 119 under control of valves 120 and 121 respectively, to liquid absorber 122. In liquid absorber 122 the first hydrocarbon mixture is contacted with stripping gas, e.g., hydrogen-containing gas flowing from liquid-gas separator 31 (FIGURE 1a) through conduit 33 and branches 34 and 36 under control of valves 35 and 37 respectively. The flows of first hydrocarbon mixture and of stripping gas are regulated and proportioned as described hereinbefore in conjunction with the description of liquid absorber 14. Gas is vented from absorber 107 through conduit 123.

Stripped first hydrocarbon mixture flows from absorber 107 through pipe 124 to heat exchanger 16 where the stripped first hydrocarbon mixture is in indirect heat exchange relation with the effluent of the hydrodecontaminator 23. From heat exchanger 16 the stripped first hydrocarbon mixture flows through conduit 125 to arsenic hydrogenator 126. At a point in conduit 125 intermediate to heat exchanger 16 and to arsenic hydrogenator 126 hydrogen sufficient to maintain a circulation of about 250 to about 1000 standard cubic feet per barrel of first hydrocarbon mixture is introduced into conduit 125. Usually recycle gas flowing from a reformer through conduit 44 (FIGURE 1a) and conduit 127 under control of valve 128 is employed.

The first hydrocarbon mixture is usually heated in heat exchanger 16 to a temperature so that when mixed with the recycle gas the mixture has a temperature not higher than about 400° F. The mixture of first hydrocarbon mixture and hydrogen-containing gas flows downwardly through arsenic hydrogenator 126 in contact with a hydrogenation catalyst, for example, a mixture of oxides of cobalt and molybdenum on alumina. In arsenic hydrogenator 126 the arsenic compounds in the first hydrocarbon mixture are converted to gaseous arsine which at temperatures below about 440° F. is not decomposed. The effluent from hydrogenator 126 flows through conduit 129 to heat exchanger 18 where the hydrogenator effluent is in indirect heat exchange relation with the effluent of hydrodecontaminator 23 flowing therefrom through conduit 24. The temperature of the hydrogenator effluent is raised to above about 440° F. in heat exchanger 18. When necessary to maintain a temperature of at least 450° F. in solid absorber 131 hot hydrogen-containing gas in amount to provide with that introduced into conduit 125 a total of about 500 to 3000 standard cubic feet of hydrogen per barrel of first hydrocarbon mixture is introduced into conduit 130 at a point contiguous to the vapor inlet of solid absorber 131. Thus, for example, hydrogen-containing recycle gas is diverted from conduit 44 through conduit 132 under control of valve 133 to heater 135. In coil 134 the heat-carrying medium, in this instance hydrogen-containing gas, i.e., recycle gas, is heated to a temperature dependent upon the temperature and volume of the hydrogenator effluent and the volume of heat-carrying medium to provide a mixture having a temperature of at least 450° F. The heated heat-carrying medium flows from heater 135 through conduit 136 to conduit 130 where the heat-carrying medium is mixed with the effluent of hydrogenator 126. Preferably, solid absorber 131 is placed as close to heat exchanger 18 as convenient to reduce the deposition of arsenic in the transfer line. The hydrogenator effluent flows into solid absorber 131 through conduit 130 at a temperature in excess of about 440° F. In contact with the solid adsorbent, Attapulgus clay, for example, and at a temperature in excess of 440° F. the arsine in the hydrogenator effluent decomposes to deposit arsenic on the adsorbent. The effluent of solid absorber 131 flows therefrom through conduit 137 to coil 20 in heater 21 where the effluent of the solid absorber 131 is heated to hydrodenitrogenizing temperatures as described hereinbefore.

In the event that the effluent from solid absorber 131 contains not more than 1 p.p.m. of nitrogen in addition to being essentially free from arsenic as defined hereinbefore, the effluent from solid absorber 131 is a suitable reformer feed or reformer feed component. In the foregoing circumstances, the effluent from solid absorber 131 is diverted through conduit 138 under control of valve 139 to the suction side of pump 52 (FIGURE 1a).

On the other hand, when the effluent from solid absorber 131 although essentially free from arsenic as defined hereinbefore has a nitrogen concentration such that when blended even in the ratio of 5 parts of absorber effluent with 95 parts of a second hydrocarbon mixture having a lower concentration of nitrogen, say 0.2 p.p.m. of nitrogen, the resultant blend contains more than 1 p.p.m. of nitrogen, i.e., when the absorber effluent contains more than about 19 p.p.m. of nitrogen, the absorber effluent flows through conduit 137 to coil 20 in heater 21. In coil 20 the solid absorber effluent is heated to hydrodenitrogenizing temperatures within the limits of about 600 to about 800° F. The heated solid absorber effluent flows from heater 21 through conduit 22 to hydrodecontaminator 23. In hydrodecontaminator 23 the solid absorber effluent is contacted with hydrogenating catalyst having hydrodenitrogenizing capabilities such as the mixture of oxides of cobalt and molybdenum described hereinbefore. From hydrodecontaminator 23 the effluent thereof flows through conduit 24 to heat exchanger 18, through conduit 25 to heat exchanger 16, and through conduit 26 to heat exchanger 27, liquid gas separator 31, and stripper 40 as described in conjunction with FIGURE 1a. The bottoms of stripper 40 comprise a blending component for a blend reformer feed as described hereinbefore, said blending component being essentially free from arsenic and containing not more than that amount of nitrogen which when blended with a second hydrocarbon mixture in the ratio of 5 to 95 parts of said blending component to 95 to 5 parts of a second hydrocarbon mixture to form a blend reformer feed the blend reformer feed is essentially free from arsenic as defined hereinbefore and contains not more than 1 p.p.m. of nitrogen.

Alternatively, a splitter can be used in place of the stripper illustrated. In that event no hydrogen-containing gas is introduced into the splitter and all of the excess reformer recycle gas flows directly to conduit 44 and thence to conduit 22. That in excess of the amount required in hydrodecontaminator 23 is diverted through conduit 46 to conduit 33 and absorber 14. Additionally, the splitter overhead flows to gasoline blending rather than back to conduit 33.

It is to be noted that stripper overhead can also be diverted from conduit 33 through conduit 46 under control of valve 47 to conduit 44 and thence to pretreater 23.

The percolated second hydrocarbon mixture is obtained for blending as follows. A low-nitrogen, high-arsenic naphtha, for example, i.e., a straight run naphtha is drawn from a source not shown through pipe 46 by pump 47. Pump 47 discharges the high-arsenic, low-nitrogen naphtha into pipe 48. The high-arsenic, low-nitrogen naphtha is pumped through clay tower 50 in upward or downward flow under conditions within the ranges set forth hereinbefore. The percolated naphtha leaves clay tower 50 through pipe 51. The percolated naphtha in pipe 51 is mixed with the hydrodecontaminated naphtha flowing through pipe 45 to provide a blend reformer feed containing not more than 1 p.p.m. of nitrogen and essentially free from arsenic as defined hereinbefore. Those skilled in the art will understand that the second hydrocarbon mixture can be treated to convert the arsenic to arsine at temperatures below 425° F., and the arsine decomposed at temperatures of 440° F. or higher as described hereinbefore.

The blend reformer feed flows through pipe 51 to the suction side of pump 52. Pump 52 discharges the blend reformer feed into pipe 53–P at a pressure in excess of the pressure existing in reforming reactor 71 (FIGURE 2).

The blend naphtha flows through pipes 53–P and 53–R to heat exchanger 64. In heat exchanger 64 the blend naphtha is in indirect heat exchange relation with the effluent from reactor 81 (final effluent). From heat exchanger 64 the blend naphtha flows through pipe 65 to heat exchanger 66 where the blend naphtha is in indirect heat exchange relation with the partially cooled final effluent. From heat exchanger 66 the blend naphtha flows through conduit 67 to coil 68 in heater 69. At a point intermediate to heat exchanger 66 and to heater 69 hydrogen-containing gas such as recycle gas flowing from separator 91 through conduit 55 to the suction side of compressor 56 and from compressor 56 through conduit 92 is mixed with the blend naphtha in the ratio of about 4 to about 20 mols of hydrogen per mol of naphtha to form a reformer charge mixture. The reformer charge mixture is heated in coil 68 to a reforming temperature within the range of about 825° F. to the maximum temperature at which the reforming catalyst is not irreversibly deactivated.

For a reforming catalyst of the following composition the reforming temperature is within the range of about 825° F. and about 980° F. dependent upon the activity of the catalyst, the operating pressure, space velocity, and the required octane rating of the $C_{5+}$ reformate. In general, for a platinum-type reforming catalyst comprising about 0.3 to about 1 percent by weight platinum and about 0.3 to about 0.8 percent by weight of chlorine reforming conditions are as follows:

Reforming temperature, °F______________ 825 to 980
Pressure, p.s.i.g______________________ 100 to 1000
Space velocity________________________ 0.5 to 10
Hydrogen-to-naphtha mol ratio__________ 4 to 20

The heated charge mixture flows from heater 69 through conduit 70 to reactor 71. The charge mixture flows downwardly through reactor 71 to conduit 72. The first reactor effluent flows through conduit 72 to coil 73 in heater 74. In coil 73 the first reactor effluent is reheated to a reforming temperature lower than, higher than, or equal to that to which the charge mixture was heated. The heated first reactor effluent flows from heater 74 through conduit 75 to reactor 76. The first reactor effluent flows downwardly through reactor 76 to conduit 77. The second reactor effluent flows through conduit 77 to coil 78 in heater 79. In heater 79 the second reactor effluent is reheated to a reforming temperature. The heated second reactor effluent flows from heater 79 through conduit 80 to reactor 81. The reheated second reactor effluent flows downwardly through reactor 81 to conduit 82. The final reactor effluent flows through conduit 82 to heat exchanger 64. From heat exchanger 64 the final effluent flows through conduit 83 to heat exchanger 84 where the final effluent is in indirect heat exchange relation with the condensate from separator 91 flowing through pipe 96. From heat exchanger 84 the final effluent flows through conduit 85 to heat exchanger 86. From heat exchanger 86 the final effluent flows through conduit 87 to heat exchanger 66. From heat exchanger 66 the final effluent flows through conduit 88 to cooler 89.

In cooler 89 the final effluent is cooled to a temperature at which $C_4$ and heavier hydrocarbons are condensed at the pressure existing in separator 91. From cooler 89 the final effluent flows through conduit 90 to high pressure separator 91. In high pressure separator 91 the condensed final effluent is separated from the uncondensed final effluent.

The uncondensed final effluent flows from high pressure separator 91 through conduit 55 to the suction side of compressor 56. Compressor 56 discharges the uncondensed final effluent, i.e., reformer recycle gas into conduit 92 at a pressure in excess of that in reactor 71. A portion of the uncondensed final effluent, usually about equal to the gas made in the reforming reaction, is diverted through conduit 42-R under control of valve 93 to conduit 42-P (FIGURE 1a) and pretreater 23 and/or hydrogenator 126 as described hereinbefore. The balance of the recycle gas flows through conduit 92 to conduit 67 where it is mixed with the reformer feed naphtha blend as previously described herein.

The condensed final effluent flows from separator 91 through pipe 94 to the suction side of pump 95. Pump 95 discharges the condensed final effluent into pipe 96 through which the condensed final effluent flows to heat exchanger 84. In heat exchanger 84 the condensed final effluent is in indirect heat exchange relation with the final effluent flowing thereto through conduit 83. From heat exchanger 84 the raw reformate flows through pipe 113 to stabilizer 97.

In stabilizer 97 light hydrocarbons are taken as overhead through pipe 98 to cooler 99. The overhead is cooled in cooler 99 to a temperature at which $C_4$ hydrocarbons are condensed. The cooled overhead flows through pipe 100 to accumulator 101. From accumulator 101 the uncondensed overhead, i.e., $C_3$ and lighter hydrocarbons, flows through pipe 102 and thence to the gas recovery main. The condensed overhead, $C_4$ and heavier hydrocarbons, flows from accumulator 101 through pipe 103 to the suction side of pump 104. Pump 104 discharges a part of the condensed overhead into pipe 105 as reflux in stabilizer 97. The portion of the condensed overhead in excess of that required for reflux flows from 103 through pipe 106 under control of valve 107 to recovery of $C_4$ hydrocarbons.

The major portion of the stabilizer bottoms flows from stabilizer 97 through pipe 108 as stabilized $C_{5+}$ reformate. The balance and minor portion of the stabilizer bottoms flows through pipe 109 to heat exchanger 86 where the stabilizer bottoms is in indirect heat exchange relation with the final effluent flowing from heat exchanger 84 through conduit 85. In heat exchanger 86 the stabilizer bottoms is heated to a temperature at which $C_4$ and lighter hydrocarbons are volatile. From heat exchanger 86 the stabilizer bottoms flows through pipe 110 to the suction side of pump 111. Pump 111 discharges the heated stabilizer bottoms into pipe 112 through which the heated stabilizer bottoms flows to stabilizer 97. Any other means of maintaining the required temperature in stabilizer 97 can be substituted for the reboiler illustrated.

I claim:
1. A method of removing arsenic from a hydrocarbon mixture which comprises in a reaction zone contacting a hydrocarbon mixture containing arsenic with hydrogenating catalyst under conditions of pressure, liquid hourly space velocity, hydrogen circulation, and at a temperature not higher than about 425° F. at which arsenic is converted to a volatile derivative of arsenic, withdrawing from said reaction zone at a temperature below 440° F. a reaction zone effluent comprising hydrocarbons and the aforesaid volatile derivative of arsenic, and contacting at a temperature higher than 440° F. said reaction zone effluent with finely divided solid adsorbent.

2. The method of removing arsenic from a hydrocarbon mixture as set forth in claim 1 wherein the finely divided solid adsorbent is hydrated aluminum-magnesium silicate.

3. The method of removing arsenic from a hydrocarbon mixture as set forth in claim 1 wherein the finely divided adsorbent is Attapulgus clay.

4. The method of removing arsenic from a hydrocarbon mixture as set forth in claim 1 wherein the hydrogenating catalyst comprises refractory oxide support and hydrogenating component.

5. The method of removing arsenic from a hydrocarbon mixture as set forth in claim 1 wherein the virgin hydrogenating catalyst comprises a mixture of oxides of cobalt and molybdenum on alumina support.

6. The method of removing arsenic from a hydrocarbon mixture as set forth in claim 1 wherein the virgin hydrogenating catalyst comprises a mixture of oxides of cobalt and molybdenum on alumina, wherein the pressure in the reaction zone is at least about 100 p.s.i.g., wherein the liquid hourly space velocity is in the range of about 1 to about 10, wherein about 350 to about 1000 s.c.f. of hydrogen per barrel of the hydrocarbon mixture are circulated through the reaction zone, wherein the temperature in the reaction zone is in the range of about 200° to about 400° F., and wherein the finely divided adsorbent is Attapulgus clay.

7. In the method of reforming naphtha containing more than 1 p.p.m. of nitrogen wherein naphtha containing in excess of 1 p.p.m. of nitrogen is hydrodenitrogenized at a temperature in excess of 440° F. in the presence of hydrogen and hydrogenation catalyst having hydrodenitrogenizing capability, wherein reformer charge stock comprising $C_5$ and heavier hydrocarbons containing not more than 1 p.p.m. of nitrogen is produced, and wherein said reformer charge stock is reformed in the presence of particle-form solid nitrogen- and arsenic-sensitive reforming catalyst the improvement which comprises prior to hydrodenitrogenizing naphtha containing more than 0.002 p.p.m. of arsenic, contacting said naphtha in a reaction zone at a temperature in the range of about 200° to 425° F. with hydrogenating catalyst capable of converting said arsenic to volatile hydrogen derivative thereof at a pressure of at least 100 p.s.i.g., at a liquid hourly space velocity not in excess of about 10, and with a circulation of at least about 350 s.c.f. of hydrogen per barrel of arsenic containing naphtha, producing a reaction zone effluent having a temperature below about 440° F. comprising hydrocarbons and volatile hydrogen derivative of arsenic, in a sorption zone at a temperature of at least 440° F. contacting said reaction zone effluent with finely divided adsorbent, and producing sorption zone effluent comprising hydrocarbons the $C_5$ and heavier of which have substantially reduced content of arsenic.

8. In the method of reforming naphtha set forth in claim 7 wherein the virgin hydrogenation catalyst in the reaction zone and the hydrodenitrogenizing catalyst each comprises a mixture of oxides of cobalt and molybdenum on alumina support.

9. In the method of reforming naphtha set forth in claim 7 wherein the virgin hydrogenation catalyst in the reaction zone and the hydrodenitrogenizing catalyst each comprises a mixture of oxides of cobalt and molybdenum, and wherein the nitrogen- and arsenic-sensitive particle-form reforming catalyst comprises platinum-group metal on alumina support.

10. In the method of reforming naphtha in the presence of nitrogen-sensitive particle-form reforming catalyst wherein naphtha containing more than 1 p.p.m. of nitrogen is hydrodenitrogenized in the presence of hydrogen and hydrogenation catalyst having hydrodenitrogenizing capability at a temperature in excess of 440° F., wherein hydrodenitrogenized $C_5$ and heavier hydrocarbons containing more than 10 p.p.m. of nitrogen are mixed with naphtha containing less than 1 p.p.m. of nitrogen to form a naphtha mixture containing more than 1 p.p.m. of nitrogen, wherein said napththa mixture is hydrodenitrogenized at a temperature in excess of 440° F. in the presence of hydrogen and hydrogenation catalyst having hydrodenitrogenizing capability, wherein reformer charge stock comprising $C_5$ and heavier hydrocarbons and containing not more than 1 p.p.m. of nitrogen is obtained, and wherein said reformer charge stock is reformed in the presence of arsenic- and nitrogen-sensitive particle-form solid reforming catalyst, the improvement which comprises prior to hydrodenitrogenization contacting naphtha containing more than 0.002 p.p.m. of arsenic with hydrogenating catalyst in a reaction zone at a temperature in the range of about 200° to 425° F. under at least 100 p.s.i.g. pressure, at a liquid hourly space velocity not in excess of about 10, and with a circulation of at least about 350 s.c.f. of hydrogen per barrel of arsenic-containing naphtha, producing a reaction zone effluent comprising hydrocarbons and volatile hydrogen derivative of arsenic, and having a temperature below about 440° F., contacting said reaction zone effluent in a sorption zone at a temperature in excess of 440° F. with finely divided solid adsorbent, producing sorption zone effluent comprising $C_5$ and heavier hydrocarbons substantially devoid of volatile hydrogen derivative of arsenic, and recovering $C_5$ and heavier hydrocarbons of substantially reduced arsenic content.

11. In the method of reforming naphtha as set forth in claim 10 wherein the virgin hydrogenating catalyst comprises a mixture of oxides of cobalt and molybdenum on alumina support.

12. In the method of reforming naphtha as set forth in claim 10 wherein the virgin hydrogenating catalyst each comprises a mixture of oxides of cobalt and molybdenum on alumina support, and wherein the arsenic- and nitrogen-sensitive particle-form solid reforming catalyst comprises platinum-group metal on alumina support.

13. In the method of reforming naphtha as set forth in claim 10 wherein the virgin hydrogenation catalyst each comprises a mixture of oxides of cobalt and molybdenum on alumina support, and wherein the arsenic- and nitrogen-sensitive particle-form solid reforming catalyst comprises about 0.35 to about 0.6 percent by weight of platinum on alumina support.

References Cited in the file of this patent

UNITED STATES PATENTS

| | | |
|---|---|---|
| 2,728,710 | Hendricks | Dec. 27, 1955 |
| 2,854,399 | Weller et al. | Sept. 30, 1958 |
| 2,867,577 | Urban et al. | Jan. 6, 1959 |
| 2,910,434 | Hess et al. | Oct. 27, 1959 |
| 2,937,134 | Bowles | May 17, 1960 |
| 2,939,833 | Wankat et al. | June 7, 1960 |
| 2,954,339 | Beavon | Sept. 27, 1960 |

UNITED STATES PATENT OFFICE
CERTIFICATE OF CORRECTION

Patent No. 3,069,350                                December 18, 1962

Amilcare Ramella

It is hereby certified that error appears in the above numbered patent requiring correction and that the said Letters Patent should read as corrected below.

Column 14, lines 13 and 19, strike out "each", each occurrence.

Signed and sealed this 5th day of November 1963.

(SEAL)
Attest:

ERNEST W. SWIDER
Attesting Officer

EDWIN L. REYNOLDS

Acting Commissioner of Patents